(12) United States Patent
Lee

(10) Patent No.: US 6,373,253 B1
(45) Date of Patent: Apr. 16, 2002

(54) HIGH-FREQUENCY ELECTRIC FIELD MEASUREMENT USING A TOROIDAL ANTENNA

(75) Inventor: Ki Ha Lee, Lafayette, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/227,463

(22) Filed: Jan. 8, 1999

Related U.S. Application Data

(60) Provisional application No. 60/070,850, filed on Jan. 8, 1998.

(51) Int. Cl.[7] .................................................. G01V 3/08
(52) U.S. Cl. ......................... 324/344; 324/258; 324/72
(58) Field of Search ................................. 324/247, 257, 324/258, 260, 127, 95, 72, 344; 343/788, 856

(56) References Cited

U.S. PATENT DOCUMENTS 5,633,648 A * 5/1997 Fischer ........................ 343/788

* cited by examiner

*Primary Examiner*—Jay Patidar
(74) *Attorney, Agent, or Firm*—Henry P. Sartorio; Joseph R. Milner

(57) ABSTRACT

A simple and compact method and apparatus for detecting high frequency electric fields, particularly in the frequency range of 1 MHz to 100 MHz, uses a compact toroidal antenna. For typical geophysical applications the sensor will be used to detect electric fields for a wide range of spectrum starting from about 1 MHz, in particular in the frequency range between 1 to 100 MHz, to detect small objects in the upper few meters of the ground. Time-varying magnetic fields associated with time-varying electric fields induce an emf (voltage) in a toroidal coil. The electric field at the center of (and perpendicular to the plane of) the toroid is shown to be linearly related to this induced voltage. By measuring the voltage across a toroidal coil one can easily and accurately determine the electric field.

11 Claims, 6 Drawing Sheets

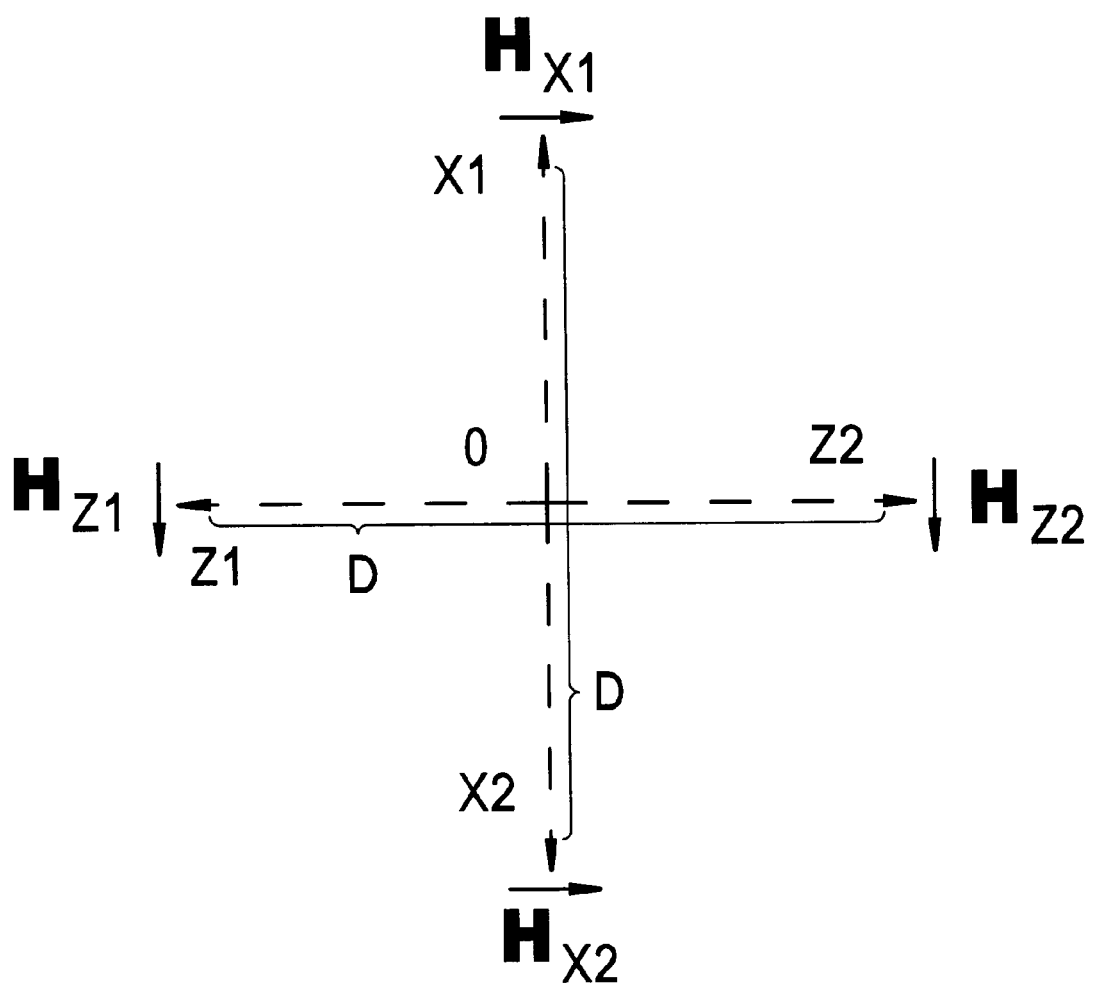

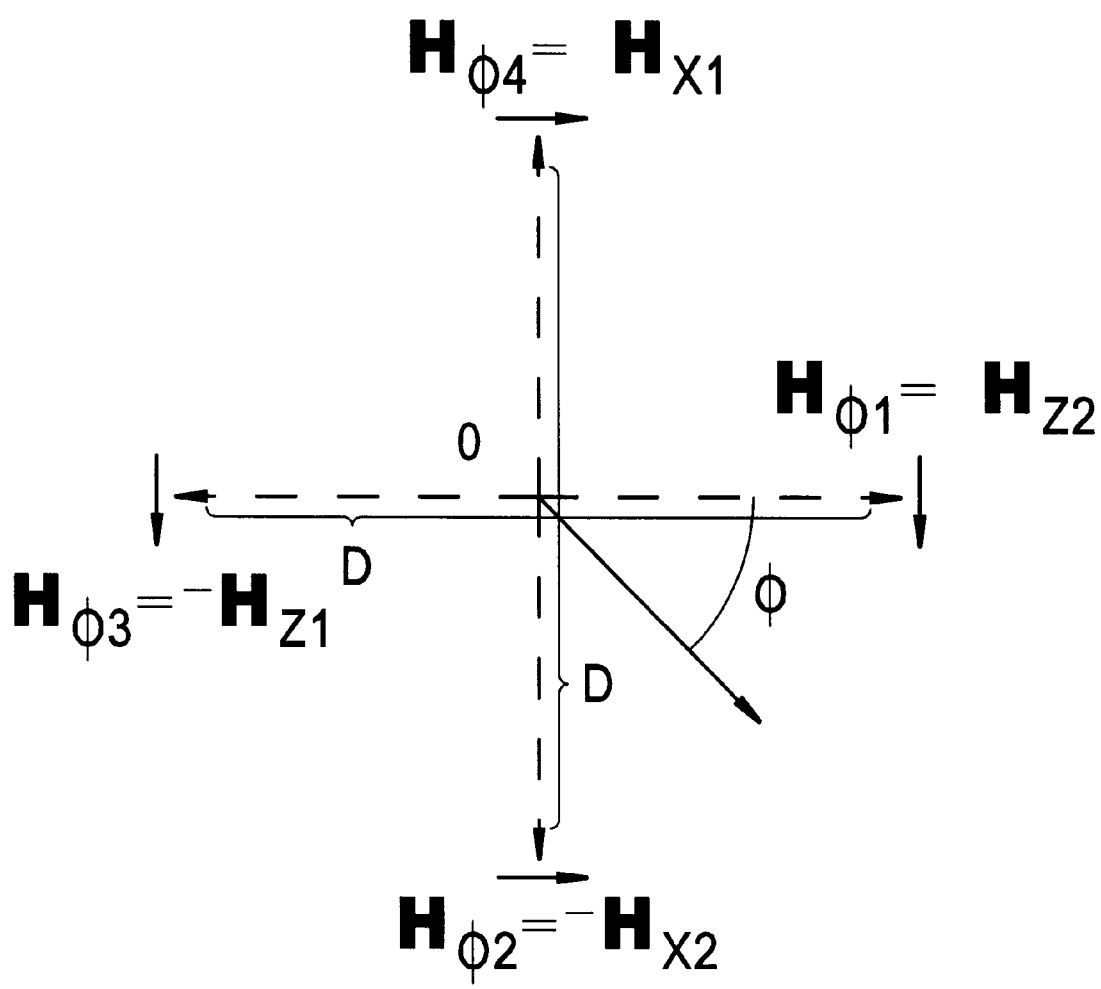

HIGH-FREQUENCY ELECTRIC FIELD MEASUREMENT USING A TOROIDAL ANTENNA

RELATED APPLICATIONS

This application claims priority of Provisional Application Ser. No. 60/070,850 filed Jan. 8, 1998.

GOVERNMENT RIGHTS

The United States Government has rights in this invention pursuant to Contract No. DE-AC03-76SF00098 between the United States Department of Energy and the University of California.

BACKGROUND OF THE INVENTION

1. Field of the Invention

The invention relates generally to the measurement of time varying electric fields, and more particularly to the measurement of electric fields with a frequency in the range of 1 MHz to 100 MHz.

2. Description of the Prior Art

Non-invasive sensing of the shallow subsurface is necessary for environmental monitoring and management, e.g. detection and delineation of buried hazardous wastes, and monitoring the condition of clay containment caps. Electromagnetic methods have been used for subsurface characterization, but there is a need for increased resolution for waste form characterization, verification, and monitoring activities. In particular, a compact detector which can be used on the surface or in a borehole is desired.

A window exists in the electromagnetic spectrum between ground penetrating radar (30 MHz to 1 GHz) and induction techniques (<100 kHz) that has not been utilized for these applications. The frequency band of 1 MHz to 100 MHz is important for environmental work because of good earth penetration and good resolution. However, the frequency range between 1.0 to 100 MHz has not been used for existing electromagnetic or radar systems to detect small objects in the upper few meters of the ground. Ground penetrating radar (GPR) can be used successfully in this depth range if the ground is resistive but most soils are, in fact, conductive (0.01 to 1.0 S/m) rendering G.P. inefficient. For example, in a soil of 0.2 S/m the maximum range for a typical GPR is only 17 cm. Other factors controlling the resolution of GPR system for small objects is the spatial averaging inherent in the electric dipole antenna and the scattering caused by soil inhomogeneities of dimensions comparable to the wavelength (and antenna size). For maximum resolution it is desirable to use the highest frequencies but the scattering is large and target identification is poor. While a traditional radar approach could be used, the antenna length at these frequencies must be too long to be practical. Accordingly it is desirable to have a detector of electric fields in the 1–100 MHz frequency range.

A toroidal coil has been suggested as a transmitter if current is forced to flow through the winding (Wait, J. R., Excitation of a conducting half-space by a toroidal coil, IEEE Antennas and Propagation Magazine, Vol.37, No. 4, p.72–74, 1995). Generated within the toroid is a strong azimuthal magnetic field, which in turn can be considered equivalent to that of an electric dipole.

SUMMARY OF THE INVENTION

Accordingly it is an object of the invention to provide a simple and compact method and apparatus for detecting time varying electric fields, particularly in the frequency range of 1 MHz to 100 MHz.

The invention is a simple and compact method and apparatus for detecting high frequncy electric fields, particularly in the frequency range of 1 MHz to 100 MHz, using a toroidal antenna. For typical geophysical applications the sensor will be used to detect electric fields for a wide range of spectrum starting from about 1 MHz, in particular in the frequency range between 1 to 100 MHz, to detect small objects in the upper few meters of the ground.

Time-varying magnetic fields associated with time-varying electric fields induce an emf (voltage) in a toroidal coil. The electric field at the center of (and perpendicular to the plane of) the toroid is shown to be linearly related to this induced voltage. By measuring the voltage across a toroidal coil one can easily and accurately determine the electric field. The sensor will greatly simplify the cumbersome procedure involved with GPR measurements with its center frequency less than 100 MHz. The overall size of the toroidal sensor can be as small as a few inches. It is this size advantage that will not only allow easy fabrication and deployment of multi-component devices either on the surface or in a borehole, but it will render greatly improved resolution over conventional systems.

BRIEF DESCRIPTION OF THE DRAWINGS

FIG. 2 illustrates the magnetic fields at four points in space, in rectangular coordinates.

FIG. 3 illustrates the magnetic fields at the four points in space of FIG. 2, in spherical coordinates.

DETAILED DESCRIPTION OF THE INVENTION

Basic Apparatus

Figure 1A:
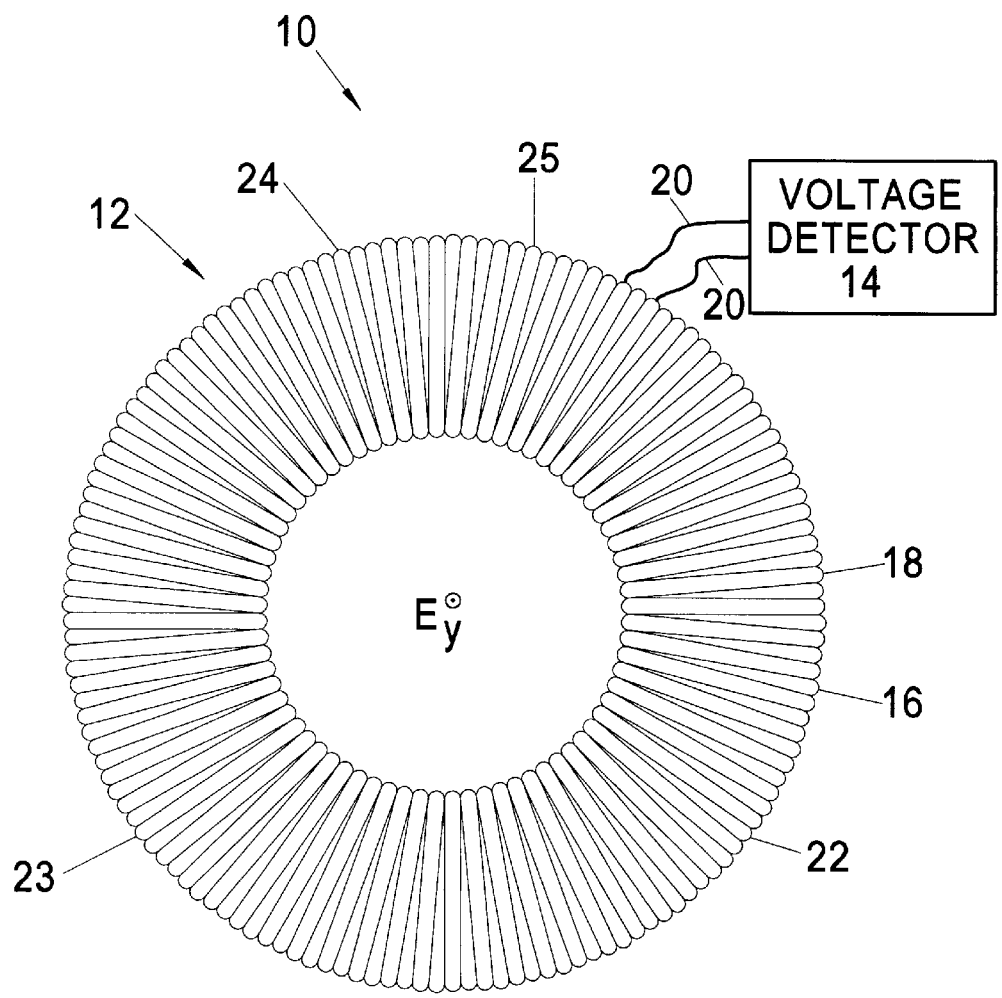
FIG. 1A is a schematic view of the high frequency electric field detector of the invention, showing a top planar view of the toroidal antenna.

As shown in FIG. 1A, an electric field detector 10 according to the invention is formed of a toroidal antenna 12 connected to a voltage detector 14. Toroidal antenna 12 is formed of a toroid 16 having a plurality of windings or loops 18 continuously and uniformly wound thereon. The ends of the windings 18 are connected by leads 20 to voltage detector 14. As explained herein, detector 10 detects a perpendicular component of a time varying electric field, e.g. $E_y$, at the center of toroid 16 by measuring the voltage induced in the windings 18. Detector 10 is suitable for detecting electric fields with a frequency in the 1 MHz to 100 MHz range. Any voltage detector 14 may be used which can measure the induced voltage at the particular frequency. The toroid 16 is divided into four arbitrary quadrants 22, 23, 24, 25 each of which has an equal number N of windings or loops 18. The greater the number of windings, the greater the induced voltage so it will be easier to detect the voltage.

Figure 1B:
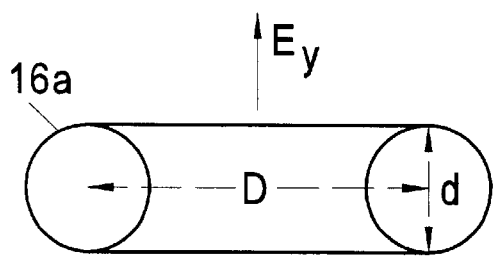
FIG. 1B is a cross-sectional view through the toroidal antenna where the toroidal has a circular cross-section.
Figure 1C:
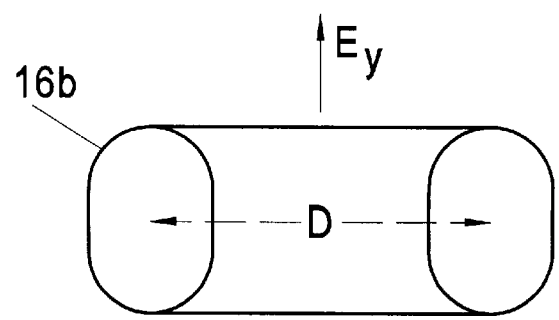
FIG. 1C is a cross-sectional view through the toroidal antenna where the toroid has a noncircular cross-section.

As shown in FIG. 1B, toroid 16 may have a circular cross-section 16a, of diameter "d" which will be the diameter of the windings or loops 18 wound on toroid 16 and $A=\pi d^2/4$ will be the cross-sectional area of the windings. The toroid diameter, measured at the center of the cross-section, is "D". Alternatively, toroid 16 may have a noncircular cross-section 16b of area A, and a toroid diameter D.

Theoretical Basis

In a source-free region, Maxwell's equations in the frequency domain with an $e^{i\omega x}$ time dependence are $$\nabla \times E = -i\omega\mu H, \text{ and} \quad (1)$$

$$\nabla \times H = (\delta + i\omega\epsilon)E. \quad (2)$$

From equation (2) one can obtain the electric field as $$E = \frac{\nabla \times H}{(\sigma + i\omega\epsilon)}, \quad (3)$$

from which each component of the electric field can be written as $$E_x = \frac{1}{(\sigma + i\omega\epsilon)}\left(\frac{\partial H_z}{\partial y} - \frac{\partial H_y}{\partial z}\right), \quad (4)$$

$$E_y = \frac{1}{(\sigma + i\omega\epsilon)}\left(\frac{\partial H_x}{\partial z} - \frac{\partial H_z}{\partial x}\right), \text{ and} \quad (5)$$

$$E_z = \frac{1}{(\sigma + i\omega\epsilon)}\left(\frac{\partial H_y}{\partial x} - \frac{\partial H_x}{\partial y}\right). \quad (6)$$

Equations (4), (5), and (6) show that electric fields can be obtained by first measuring magnetic fields and taking their 'rotation'. The rotation (curl) operation needs to be approximate in nature because in practice it cannot be evaluated at a point in space. As an example the solution of $E_y$ shown by equation (5) is obtained. First, magnetic fields $H_{x1}$, $H_{x2}$, $H_{z1}$, $H_{z2}$ are measured at four points in space $x_1$, $x_2$, $z_1$, $z_2$ about a center point "0" as shown in FIG. 2. The distance between opposed pairs of points $x_1$–$x_2$, and $z_1$–$z_2$ is D.

Then the electric field at the center in the y-direction (orthogonal to to x-z plane) can be evaluated as $$E_{y0} = \frac{1}{D(\sigma + i\omega\epsilon)}(H_{x2} - H_{x1} - H_{z2} + H_{z1}), \quad (7)$$

where D is the distance used for making the difference measurement. The same distance is used for both components in this example.

In cylindrical coordinates, FIG. 2 may be represented by FIG. 3, where the four points are designated by the angle $\phi$ in the plane, with the corresponding magnetic field components as shown therein.

The electric field given by equation (7) can also be replaced by $$E_{y0} = \frac{1}{D(\sigma + i\omega\epsilon)}(H_{\phi 1} + H_{\phi 2} + H_{\phi 3} + H_{\phi 4}), \quad (8)$$

or, equivalently $$E_{y0} = \frac{1}{D(\sigma + i\omega\epsilon)}\sum_{j=1}^{4} H_{\phi j}. \quad (9)$$

Because of the geometrical similarity, any set of two pairs of orthogonal magnetic fields will give exactly the same electric field at the center. Thus, for N such sets, $$E_{y0} = \frac{1}{ND(\sigma + i\omega\epsilon)}\sum_{j=1}^{4N} H_{\phi j}. \quad (10)$$

This is a useful relationship relating the sum of azimuthal magnetic field measurements to the axial electric field at the center of such an arrangement.

Inductive Electric Field Measurement

Magnetic fields can be measured using a loop. In the presence of a time-varying magnetic field a small voltage ($\Delta V$) is induced in a loop and is given by $$\Delta V = -i\omega\mu \int H \cdot ds \approx -i\omega\mu A H, \quad (11)$$

where A is the area of the loop, and it is assumed that the magnetic field is normal to the loop.

The magnetic field supporting this voltage can be estimated by $$H = \frac{\Delta V}{-i\omega\mu A}. \quad (12)$$

Figure 4:
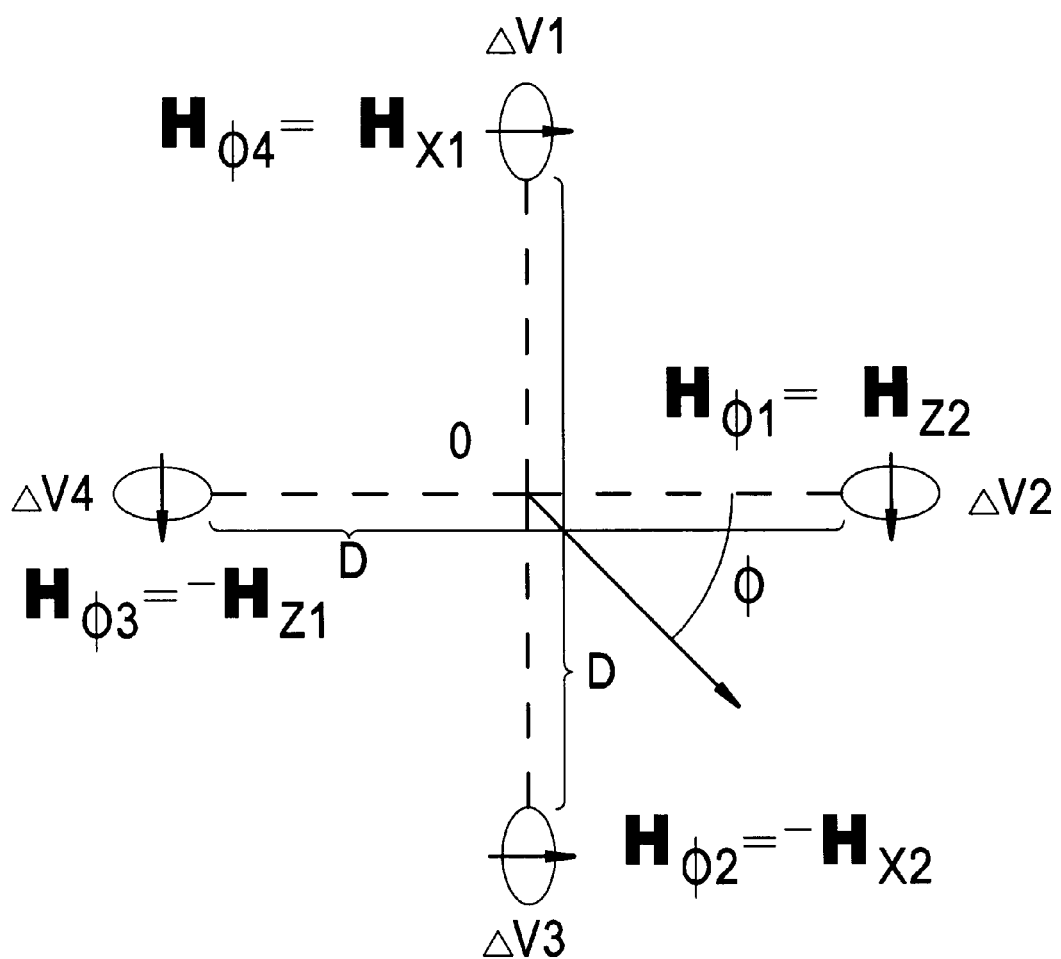
FIG. 4 shows a four loop electric field detector with a loop positioned at each of the four points in space of FIG. 3.

Consider a four-loop system as shown in FIG. 4, with one loop at each of the four points of FIGS. 2–3. The magnetic field at each point will induce a voltage in the corresponding loop. If the loops are connected, then the total induced voltage will be the sum of the voltages induced in each loop.

By substituting equation (12) into (9), one obtains $$E_{y0} = \frac{1}{D(\sigma + i\omega\epsilon)}\frac{1}{(-i\omega\mu A)}\sum_{j=1}^{4}\Delta V_j = \frac{1}{DAk^2}\sum_{j=1}^{4}\Delta V_j, \quad (13)$$

where k is the propagation constant. For a measurement scheme using a toroid consisting of 4N continuously wound loops with N equal number of loops in each quadrant, and in view of equations (10) and (13), the electric field at the center is given by $$E_{y0} = \frac{1}{NDAk^2}\sum_{j=1}^{4N}\Delta V_j. \quad (14)$$

Because all loops are wound continuously, the summation can be replaced by a total voltage induced in a toroid consisting of 4N loops. The final expression for the electric field then becomes $$E_{y0} = \frac{V}{NDAk^2}. \quad (15)$$

The electric field measured this way may be called the 'inductive' measurement as opposed to the 'capacitive' one common to most of the electric field measurement schemes using antennae.

Practical Considerations—Sensitivity Analysis

The 'inductive' method of measuring the electric field is based on the voltage measurement using a toroid. Hence it is necessary to evaluate the amplitude of the expected emf induced within a typical toroidal and see if it can be measured. From equation (15), the voltage sum induced in a toroidal antenna is found to be $$V = k^2 NDAE_{y0} \quad (16)$$

Figure 5:
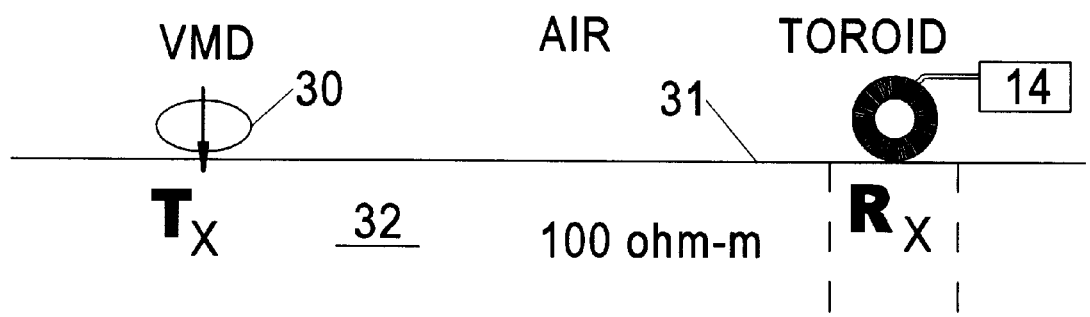
FIG. 5 illustrates the use of a toroidal antenna to measure electric field at a surface.

As shown in FIG. 5, a vertical magnetic dipole (VMD) source 30, e.g. an electromagnetic transmitter, of unit moment, is at a position Tx, 10 m away from the point of measurement Rx on the surface 31 of a 100 ohm-m half space 32, e.g. a geological formation. A toroidal antenna 12 is at position Rx and is connected to an associated voltage detector 14. Specifications of the toroid are: the toroid diameter D=2", loop diameter d=1", and the number of turns in one quadrant N=25 (total number of turns is therefore 100). The overall size or outer diameter (D+d) of the toroid is 3'.

The EM1D code is a computer code which simulates electromagnetic (EM) fields in one dimensional (1D) earth. The code is widely used and available from University of California Lawrence Berkeley National Laboratory, where it was developed.

Figure 6:
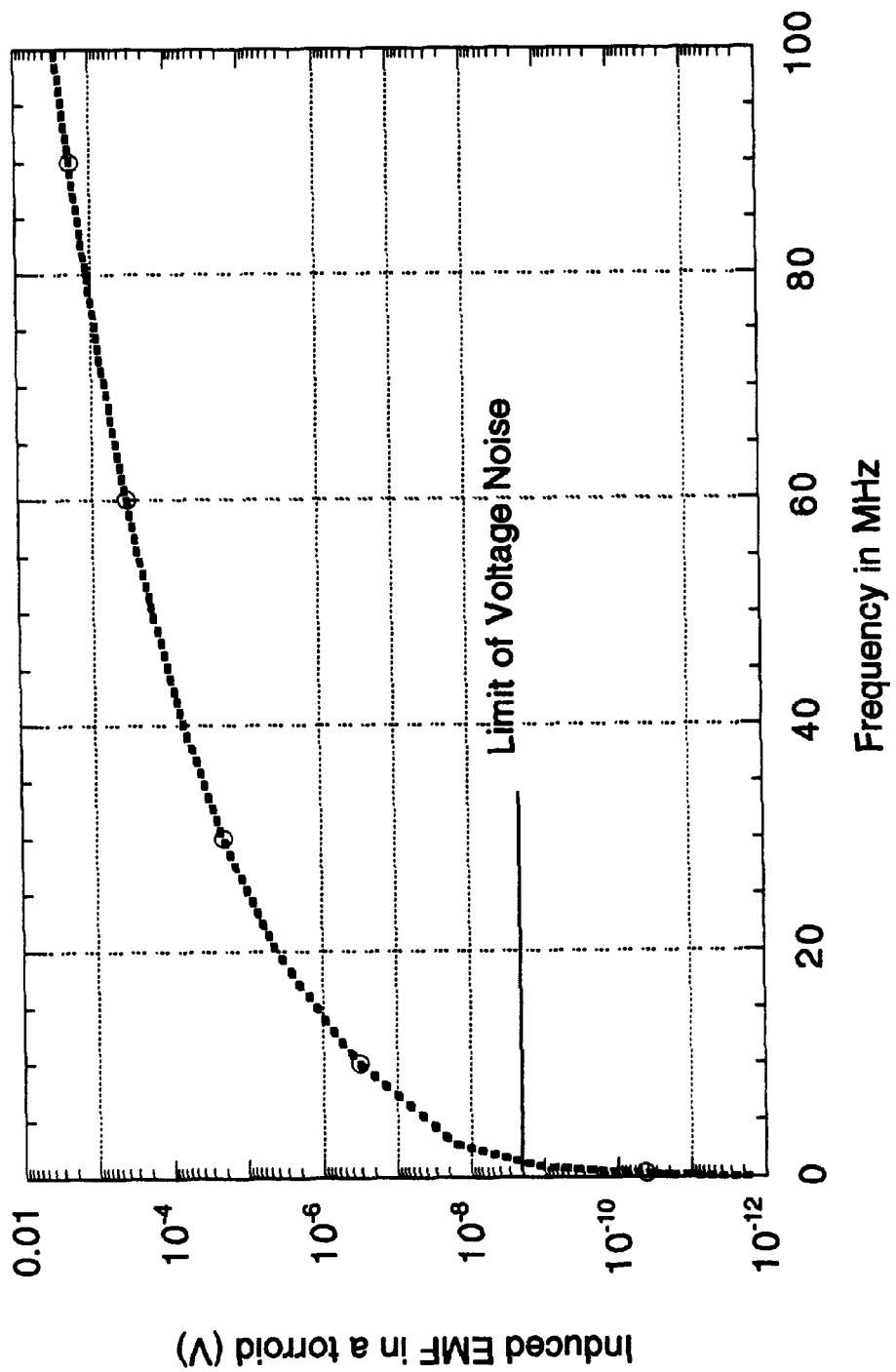
FIG. 6 is a graph of induced voltage as a function of frequency.

The electric field on the right hand side of equation (15) is obtained using the EM1D code over the half-space shown in FIG. 5. FIG. 6 shows the induced voltage as a function of frequency. As a reference, this illustration also shows the electronic noise level of a commercial amplifier. As can be seen the voltage induced in the toroid is greater than the noise limit as the frequency is increased above 1 MHz. So, the 3" toroid has enough sensitivity to cover a range of frequencies above 1 MHz. The smallness of the sensor is a great advantage over the conventional 'capacitive' linear antenna. At 30 MHz, for example, the linear antenna length will be about 17', 68 times longer than the 3" torroid. Furthermore, the size of the torroid stays the same for all frequencies because tuning is of much less concern for inductive measurements.

The small size of the toroidal antenna of the invention, and its ability to detect voltages at the desired frequency range, makes it ideal for geophysical applications. However, it is not limited to geophysical applications, and may be used for other applications, to measure electric fields from any sources. In certain applications, such as geophysical characterization, it may be used with an associated electromagnetic transmitter or source, e.g. source 30 of FIG. 5, which will produce an electric field which carries information based on the material or objects through which it passes. The detector of the invention can then be used to detect the modified electric field to obtain the information about the material or objects through which the source field has passed. By changing the orientation of the toroid, the electric field in any direction can be measured. Since the antenna is so small, this is a great advantage in a small space such as a borehole, e.g. borehole 33 in FIG. 5.

Changes and modifications in the specifically described embodiments can be carried out without departing from the scope of the invention which is intended to be limited only by the scope of the appended claims.

What is claimed is:

1. Apparatus for detecting components of a time-varying electric field, including fields having a frequency in the range of about 1 MHz to about 100 MHz, comprising:

a compact toroidal antenna;

a voltage detector connected to the toroidal antenna to detect an induced voltage proportional to a component of the electric field perpendicular to the plane of the toroidal antenna at the center of the toroidal antenna;

wherein the toroidal antenna comprises:

a toroid;

a multi-turn continuous uniform winding around the toroid, the voltage detector being connected to the winding to detect a voltage induced therein by a time-varying magnetic field associated with the time-varying electric field;

and further wherein the electric field component $E_{io}$ in the i-direction at the center of the toroidal antenna is given by $E_{io}=V/[k^2NDA]$ where V is the measured voltage induced in the toroidal antenna, k is the propagation constant of the toroid, N is the number of loops or turns in the winding per quadrant of the toroid (4N total turns), D is the diameter of the toroid, and A is the cross-sectional area of the toroid and each loop or turn of the winding.

2. The apparatus of claim 1 wherein the toroid has a diameter D and a circular cross-section of diameter d, and the cross-sectional area is $A=\pi d^2/4$.

3. The apparatus of claim 2 wherein D is about 2 inches and d is about 1 inch.

4. The apparatus of claim 1 wherein the toroid has a diameter D and a noncircular cross-section of cross-sectional area A.

5. The apparatus of claim 1 wherein the winding comprises N loops or turns per quadrant, and N ranges from 1 to 25.

6. The apparatus of claim 5 wherein N=25.

7. The apparatus of claim 1 further comprising an associated source for producing the time-varying electric field.

8. A method for detecting components of a time-varying electric field, including fields having a frequency in the range of about 1 MHz to about 100 MHz, comprising:

positioning a compact toroidal antenna;

detecting an induced voltage in the toroidal antenna, the voltage being proportional to a component of the electric field perpendicular to the plane of the toroidal antenna at the center of the toroidal antenna;

and further comprising forming the toroidal antenna of:

a toroid;

a multi-turn continuous uniform winding around the toroid, the voltage being induced in the winding by a time-varying magnetic field associated with the time-varying electric field;

and further wherein the electric field component $E_{io}$ in the i-direction at the center of the toroidal antenna is determined by $E_{io}=V/[k^2NDA]$ where V is the measured voltage induced in the toroidal antenna, k is the propagation constant of the toroid, N is the number of loops or turns in the winding per quadrant of the toroid (4N total turns), D is the diameter of the toroid, and A is the cross-sectional area of the toroid and each loop or turn of the winding.

9. The method of claim 8 further comprising positioning the toroidal antenna on the surface of a geophysical area to be monitored.

10. The method of claim 8 further comprising positioning the toroidal antenna in a borehole.

11. The method of claim 8 further comprising producing a time-varying electric field and detecting the induced voltage in the toroidal antenna to determine characteristics of materials or objects in the path of the electric field.

* * * * *